United States Patent [19]

Busch

[11] 4,409,107

[45] Oct. 11, 1983

[54] METHOD AND APPARATUS FOR AERATING BODIES OF WATER

[75] Inventor: Charles D. Busch, Rte. 3, Box 188, Lafayette, Ala. 36862

[73] Assignee: Charles D. Busch, Lafayette, Ala.

[21] Appl. No.: 106,266

[22] Filed: Dec. 21, 1979

[51] Int. Cl.³ .............................. C02F 1/72; C02F 7/00
[52] U.S. Cl. .................................... 210/758; 210/219; 210/242.2; 210/629; 261/92; 261/120; 366/102; 366/164
[58] Field of Search ............. 261/92, 120; 210/242 A, 210/14, 15, 63 R, 219; 366/102-104, 164, 326, 327

[56] References Cited

U.S. PATENT DOCUMENTS

| | | | |
|---|---|---|---|
| 3,561,738 | 2/1971 | Galeano | 210/242 A |
| 3,759,495 | 9/1973 | Boler et al. | 210/242 A |
| 3,794,303 | 2/1974 | Hirshon | 261/120 |
| 3,846,517 | 11/1974 | Ross | 210/242 A |

FOREIGN PATENT DOCUMENTS 2344503  11/1977  France ............................. 210/219

Primary Examiner—Benoit Castel
Attorney, Agent, or Firm—Shoemaker and Mattare, Ltd.

[57] ABSTRACT

An aerator for aerating a body of water such as a catfish pond, or the like, operates by stirring the water in the body of water. A paddlewheel having movable paddles stirs the water near the surface to mix oxygen-rich surface water with oxygen-deficient deep water.

15 Claims, 5 Drawing Figures

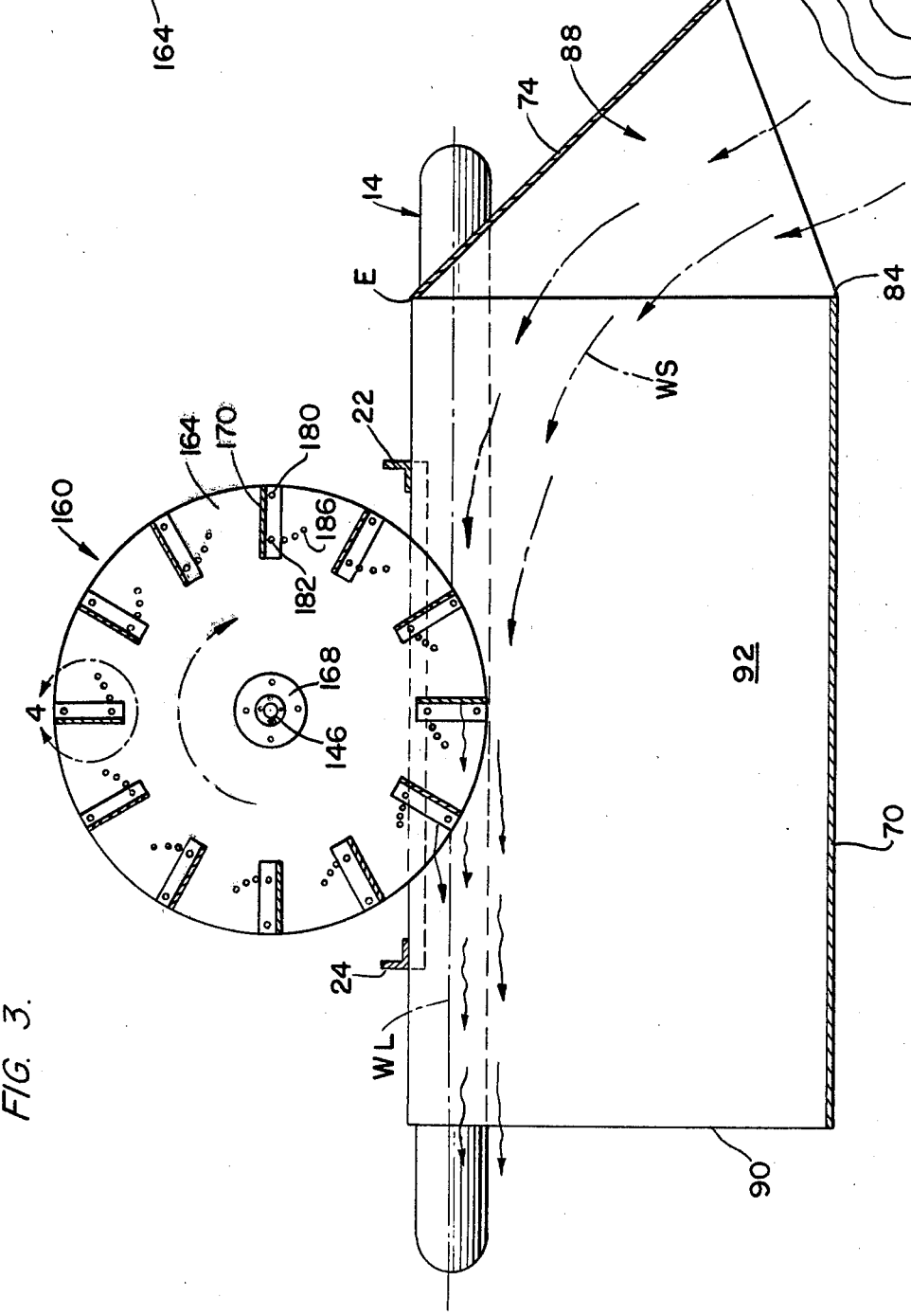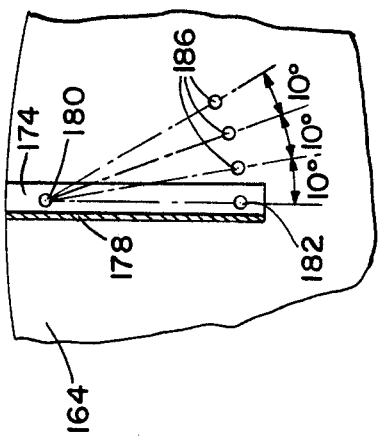

METHOD AND APPARATUS FOR AERATING BODIES OF WATER

BACKGROUND OF THE INVENTION

The present invention relates in general to aerators, and, more particularly, to aerators for use in ponds, and the like.

Growth in the catfish industry from less than 100 acres of ponds in 1955 to over 40,000 acres in 1970 is indicative of the industry's potential. The production of one ton per acre per year through extensive culture versus the production of two-and-a-half tons per acre in intensive culture indicates the effect aeration and circulation can have on fish in a large pond system. Furthermore, the small experimental pond production rate of 10 tons per acre in a 210-day experiment indicates that intensive management of a closed loop water system has possibilities for further refinement.

In addition to higher production, intensive catfish culture has other attractive aspects. Feeding and harvesting operations can be simplified and more easily mechanized. The fish are more readily observable for disease control and growth rate. Predators and other unwanted large pond inhabitants are more easily eliminated. However, some aspects of intensive culture can be detrimental to profitable production. The problems of waste disposal and continuous good water quality are foremost, including the costs which aeration and circulation originate.

A low level of dissolved oxygen in catfish ponds has long been recognized as a major cause of fish kills.

On a sunny day, the plant life in a catfish pond manufactures oxygen rapidly enough to boost the pond water oxygen concentration up to supersaturated levels. It is not uncommon to measure 10–14 parts per million (p.p.m.) of oxygen even though the saturation level is only 7 or 8 p.p.m. At least this is true in the top few feet of pond water penetrated by sunlight. Beneath the level of light penetration, if there is no top to bottom water movement, the oxygen concentration may be near zero p.p.m. Catfish cannot survive in water in which oxygen concentration has dropped below about 1.0 p.p.m.

Since oxygen depletion is the most common cause of massive fish kills, it is beneficial to maintain adequate levels of dissolved oxygen in the deeper locations of the pond. This allows for a more continuous oxidation of waste products and increases the total reserve of oxygen available in the pond.

Combination of warm weather and cloudy days in late summer can result in low oxygen levels for fed catfish ponds. The critical period is likely to be just after sunrise when overnight demands have depleted the oxygen storage in the water, and resupply by photosynthesis has not been activated. When oxygen levels drop below about 3 p.p.m., catfish will usually not feed with enthusiasm. As above-mentioned, oxygen levels below 1.0 p.p.m. are likely to lead to massive fish kills.

Oxygen deficiency is a result of increased oxygen demands of fish populations, surrounding biota, and the oxidation of feed residues produced through intensive fish culture. Stratification of pond water, creating an oxygen-poor lower level, the decrease in oxygen solubility with increasing water temperature, and the decrease in photosynthetic oxygen production caused by a series of cloudy days will increase the danger of oxygen deficits.

Several types of mechanical aerators have been used to maintain an adequate dissolved oxygen level in catfish ponds. These aerators include air blowers, submerged pumps, and propellers. Other aerators are disclosed in U.S. Pat. Nos. 3,561,738, 3,595,538, 3,747,904, 3,846,517 and 3,928,512. However, an examination of oxygen transfer theory has shown that use of mechanical aerators may decrease instead of increase pond water oxygen levels. Photosynthetic production of oxygen can result in supersaturated concentrated levels while the maximum level attainable using mechanical aeration is saturation.

Therefore, there is need for a device which aerates without splashing, bubbling or spraying.

SUMMARY OF THE INVENTION

The aerator embodying the teachings of the present invention aerates by stirring instead of splashing, bubbling or spraying.

The concept of aeration through circulation and mixing of surface water of high-oxygen content with deep water of low-oxygen content requires only a fraction of the energy demands associated with most existing aerators.

The device includes a paddlewheel mounted on a flotation means and which is driven by a small motor which is also mounted on the flotation means. A raceway has an intake located beneath the surface of the water, and the paddlewheel drives water through the raceway.

Water from beneath the surface is brought to the surface, thereby mixing the lower oxygen-poor water with oxygen-rich surface waters.

A low rotational speed of 40 revolutions per minute (r.p.m.), or less, avoids splashing and unnecessary turbulence, and the aerator is easily portable and easily positionable in a body of water. A single person can move the aerator and set that aerator up.

The paddlewheel includes movable paddles which can be moved to change the pitch thereof and thereby achieve the most efficient mixing process.

The aerator can be used to aerate ponds for various intensive agriculture operations such as catfish, trout and prawn production. Other uses for the aerator disclosed herein include waste treatment in improved management of aerobic livestock lagoons.

OBJECTS OF THE INVENTION

It is a main object of the present invention to aerate water in a pond without splashing, bubbling or spraying.

It is another object of the present invention to aerate water in a pond by stirring.

It is yet another object of the present invention to aerate water in a pond while having low energy requirements.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of an aerator embodying the teachings of the present invention in a body of water such as a catfish pond, or the like.

FIG. 3 is a view taken along line 3—3 of FIG. 2.

FIG. 4 is a view taken along line 4 of FIG. 3.

FIG. 5 is a schematic of a catfish pond with aerator locations indicated.

DETAILED DESCRIPTION OF THE INVENTION

Figure 1:
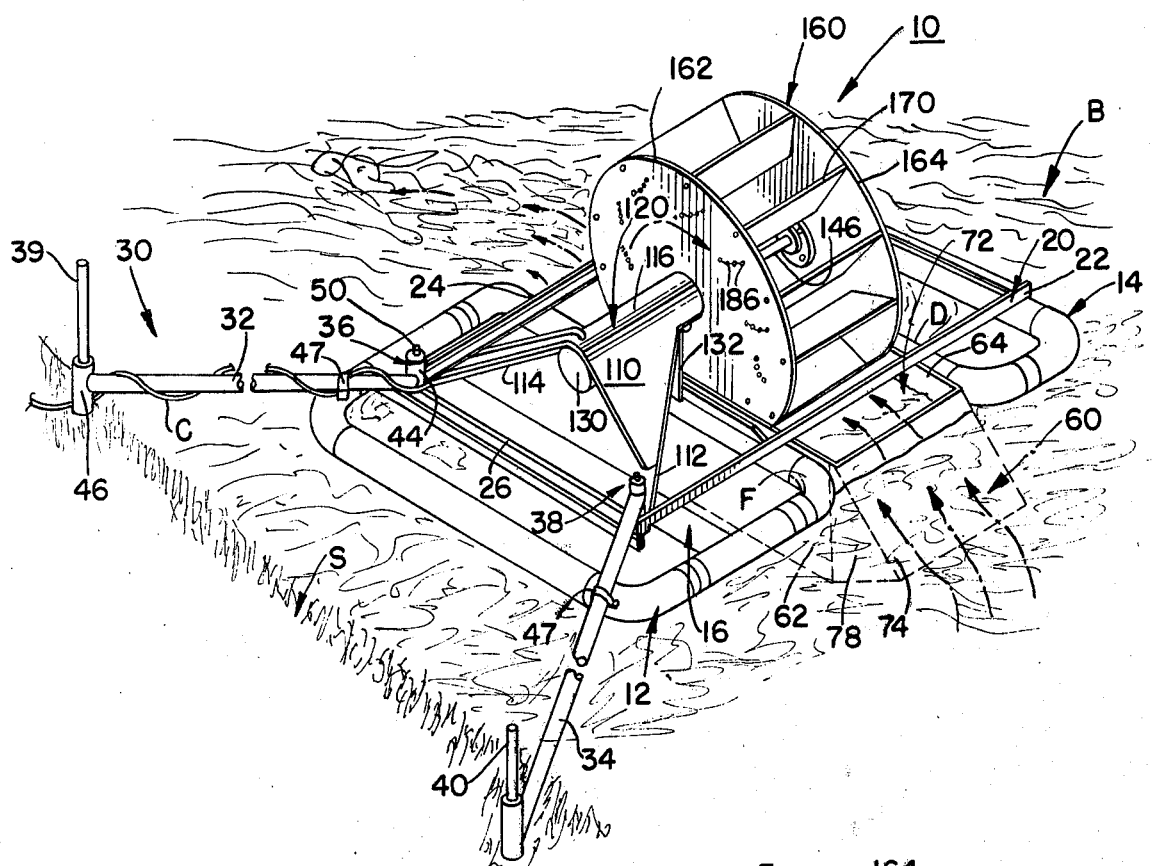

Shown in FIG. 1 is an aerator 10 situated in a body of water B. The aerator 10 includes two rectangular flotation collars 12 and 14 having sufficient buoyancy to hold the aerator in the desired position with respect to water level WL of the body of water B. Flotation collar 12 includes three longitudinal members, one of which is a brace 16, and is wider than the collar 14 in the preferred embodiment.

A frame 20 is mounted on the flotation collars and includes first and second cross-braces 22 and 24 connected together by a longitudinal brace 26. The frame braces are preferably formed of angle iron, but can be formed of other material if suitable. The frame braces are attached to the flotation collars in any suitable manner.

An anchoring means 30 anchors the aerator 10 to land, such as a shore S, or the like. The anchoring means includes a pair of anchor legs 32 and 34 each connected to the frame 20 by connections 36 and 38, respectively, and a pair of anchor spikes 39 and 40 each securely embedded in the shore S. The anchor legs can be pipes, or the like, if so desired. Each of the anchor legs includes a first tubular keeper 44 on one end thereof and a second tubular keeper 46 on the other end thereof. The first tubular keeper 44 receives the pin 50 which is attached to the frame. The keeper 44 is held against axial movement thereof with respect to the pin 50, but can pivot about the pin. The second keeper 46 receives one of the spikes 39 or 40, and can pivot about that spike as well as move axially thereof. The anchor legs are of suitable length to position the aerator properly in the body of water B. The addition of straps 47 or other such clamps between the tubular anchor legs 32 and 34 and the flotation collar prevents movement of the anchor legs with respect to the pins and permits proper positioning of the anchoring means to securely hold the aerator in the desired position.

Figure 2:
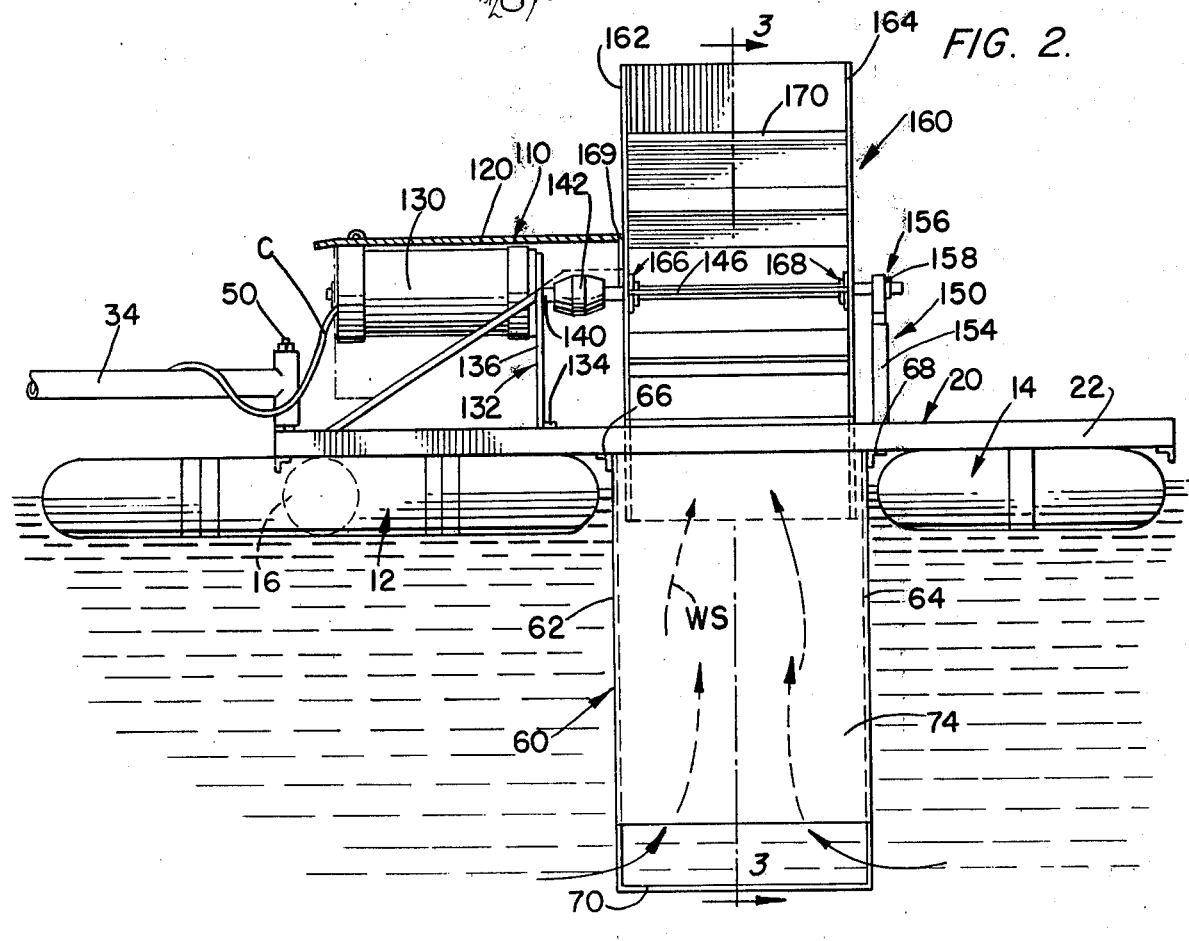
FIG. 2 is an end elevation view of an aerator embodying the teachings of the present invention, with the motor cover partially cut away.

A raceway defining means 60 is mounted on the frame 20 to depend downwardly therefrom and into the water. The raceway defining means includes a pair of sides 62 and 64 which extend longitudinally of the flotation collars and which are attached to the frame cross-braces by brackets 66 and 68, as shown in FIG. 2. A bottom 70 is mounted on the sides 62 and 64, and the top 72 of the raceway is open. A forwardly declining end 74 is integrally mounted on the edges of the sides 62 and 64, and skirts, such as skirt 78, integrally attach the end 74 to the sides 62 and 64. The lower tip 82 of the end 74 is spaced from the edge 84 of the bottom to define a rising channel 88. The other end 90 of the raceway is open, and thus the raceway includes riser channel 88, and horizontal channel 92, with the riser channel forming an intake to the raceway and the open end 90 forming an exit of the raceway. Water flow direction is thus indicated in FIG. 3 by the arrows WS.

An alternative embodiment of the raceway 60 includes an entry section similar to the section 88, but has a linear section defined only by the internal longitudinally extending portions D and F of the flotation collars. The entranceway defining means 78 will be suspended from the frame element 22 and hinged thereto. Thus, as shown in FIG. 3, top end edge E will be hingeably connected to the leg 22. Of course, bottom 70, as well as sides 62 and 64, will not be included in such alternative embodiment. The skirts 78 will be included in this alternative embodiment.

An arch-like motor cover 110 is pinned to diagonal motor mount braces 112 and 114 and shelters the motor 130 from rain and other adverse elements.

A motor 130 is unsupported at one end thereof and is mounted on the frame at the other end thereof by a brace member 132 which includes a horizontal member 134 mounted on the ends thereof on the frame cross-braces 22 and 24, and upright member 136 mounted on the horizontal member. rigidity of the mounting brackets is assured by the diagonal brackets 112 and 114.

The motor is preferably electric with a power cord C connecting that motor to a suitable power source (not shown). However, other types of motors, such as petroleum, wind powered, or the like, can also be used without departing from the scope of the present disclosure.

The motor includes an output shaft 140 connected to a flexible coupling 142. A shaft 146 is connected at one end thereof to the coupling 142 and extends transversely of the collars across the raceway top 72, and is supported at the other end thereof by a bearing mount 150. The bearing mount 150 includes a horizontal member mounted at the ends thereof on the frame cross-braces 22 and 24, and an upright member 154 mounted on the horizontal member. A journal bearing 156 is mounted on the upright member by a journal box 158, and rotatably receives the journal, or shaft 146. As is evident from the foregoing, the motor 130 rotates the shaft 146 via the output shaft 140 and the flexible coupling 142.

A paddlewheel 160 is mounted on the shaft 146 for rotation therewith, and includes a pair of circular side members 162 and 164 mounted in spaced parallelism with each other on the shaft 146 by mounting hubs 166 and 168, respectively. The motor cover 120 extends over the flexible coupling 142 but does not touch the side member 162 to define a gap 169 between the stationary motor cover and the movable side member as best shown in FIG. 2.

A plurality of paddles 170 are each mounted at each end thereof on the side members 162 and 164. The paddles are preferably channel-shaped with a pair of edges 174 and a web member 178 integrally connecting the edge members together.

As best shown in FIG. 4, the paddles are each connected at each end thereof to one of the side members by a first pin 180 located near one longitudinal side edge of the paddle, and a second pin 182 located near another longitudinal side edge of the paddle. The first pin 180 is a pivot pin and the second pin 182 is a fixing pin which is removable from the paddle and the frame member, and, as indicated in FIG. 4, the paddle can be cocked at various angles with respect to a radius of the frame side member to produce various pitches for the angle and thereby produce the desired contact angle between the paddle and the body of water. Fixing pin receiving holes 186 are defined in each of the side members to receive the fixing pins 182 and thereby fix each of the paddles in the desired orientation.

In operation, the motor and the flexible coupling cause the shaft 146 to rotate, thereby rotating the paddlewheel and agitating the water at and near the water level WL. A flow gradient is established, and water moves through the raceway in the direction WS and is impulsed toward the outlet end thereof. The water emerges from the outlet of the raceway in a forward moving, mixed state. The agitation of the water is thus carried out in a stirring motion as opposed to splashing, bubbling or spraying motions. The water moves in a generally upward direction through the intake of the raceway, then in a generally linear horizontal direction through the raceway and out the exit end thereof, with only an insubstantial and negligible amount of water being lifted above the water level WL.

The mixing of the water by the aerator 10 thus decreases, if not completely eliminates, oxygen stratification in a body of water near the aerator. A plurality of aerators can be strategically placed in the body of water to fully aerate that body of water. An example of such aerator placement is indicated in FIG. 5.

Preferably, the paddlewheel rotates at 40 r.p.m. or less, and the intake end of the riser is located about 12 inches beneath the surface of the water. Such low rotational speed and intake placement avoids splashing and unnecessary turbulence. A 1/16 horsepower motor has proven to be adequate for the aerator 10, and a 1/15 horsepower motor as also been successful.

As this invention may be embodied in serveral forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An aerator for aerating bodies of water such as catfish ponds, or the like, by stirring, comprising:
    flotation means;
    channel defining means connected to said flotation means, said channel defining means defining a channel having an intake section located to be submerged when said flotation means is located in a body of water, and an exit section located near the surface of such water;
    a paddlewheel mounted on said flotation means to move deep water located adjacent said intake section upwardly into then horizontally and linearly through said channel to be discharged at or near the surface of the body of water via said exit section when said flotation means is located in a body of water, said paddlewheel being rotated at about 40 revolutions per minute or less for moving water through said channel by means of a stirring action with essentially no splashing, bubbling or spraying occurring anywhere in said channel and gently moving oxygen-deficient deep water to the surface to be mixed with oxygen-rich surface water while moving essentially no water above the surface of such body of water; and
    a motor connected to said paddlewheel for operating said paddlewheel.

2. The aerator defined in claim 1 wherein said paddlewheel is mounted on said flotation means for rotation, and said motor rotates said paddlewheel.

3. The aerator defined in claim 2 wherein said paddlewheel includes a pair of spaced apart, essentially circular side members, and a plurality of paddles each mounted on said side members.

4. The aerator defined in claim 3 wherein said paddles include side edges and connecting means for connecting said side edges to said paddlewheel side members, said connecting means including a pair of pivot pins pivotally connecting each of said paddles to said side members and a fixing pin removably connecting one edge of each paddle to said side members.

5. The aerator defined in claim 4 wherein said side members have a plurality of fixing pin receiving holes defined therein so that the pitch of each paddle can be changed.

6. The aerator defined in claim 2 further including a coupling connected to an output shaft of said motor, and a second shaft connected to said coupling for rotation therewith, said paddlewheel being connected to said second shaft for rotation therewith.

7. The aerator defined in claim 1 wherein said flotation means includes a plurality of rectangular collars.

8. The aerator defined in clain 7 further including a motor mount mounted on said frame and mounting said motor thereon adjacent said paddlewheel.

9. The aerator defined in claim 1 further including a frame mounted on said flotation means.

10. The aerator defined in claim 1 further including anchoring means connecting said flotation means to land where said flotation means is located in a body of water.

11. The aerator defined in claim 1 wherein said intake section includes a forwardly declining frame depending into the water, and said exit section includes a portion of said channel defining means.

12. The aerator defined in claim 11 wherein said channel defining means is horizontally disposed.

13. A method of aerating a body of water such as a catfish pond, or the like, comprising the steps of:
    using a paddlewheel, stirring water in a body of water near the surface of such water;
    moving the stirring water from just below the surface of the water generally upward then moving that water in a generally horizontal direction at or near the surface so that oxygen-deficient deep water is moved to the surface to be mixed with oxygen-rich surface water while essentially no water is removed from the body of water; and
    rotating the paddlewheel slowly enough so that water is stirred with essentially no splashing, bubbling or spraying.

14. The method defined in claim 13 wherein a plurality of aerators are used.

15. The method defined in claim 14 wherein each aerator includes a paddlewheel and further including a step of rotating those paddelwheels at about 40 revolutions per minute or less.

* * * * *